(12) United States Patent
Billawal et al.

(10) Patent No.: US 10,042,924 B2
(45) Date of Patent: Aug. 7, 2018

(54) SCALABLE AND EFFECTIVE DOCUMENT SUMMARIZATION FRAMEWORK

(71) Applicant: Yahoo Holdings, Inc., Sunnyvale, CA (US)

(72) Inventors: Youssef Billawal, Sunnyvale, CA (US); Yashar Mehdad, Sunnyvale, CA (US); Dragomir Radev, New York, NY (US); Amanda Stent, New York, NY (US); Kapil Thadani, New York, NY (US)

(73) Assignee: OATH INC., New York, NY (US)

( * ) Notice: Subject to any disclaimer, the term of this patent is extended or adjusted under 35 U.S.C. 154(b) by 122 days.

(21) Appl. No.: 15/019,646

(22) Filed: Feb. 9, 2016

(65) Prior Publication Data

US 2017/0228457 A1    Aug. 10, 2017

(51) Int. Cl.
G06F 17/30 (2006.01)
G06F 17/27 (2006.01)

(52) U.S. Cl.
CPC ...... *G06F 17/30719* (2013.01); *G06F 17/271* (2013.01); *G06F 17/277* (2013.01); *G06F 17/279* (2013.01)

(58) Field of Classification Search
CPC ............. G06F 17/30719; G06F 17/279; G06F 17/271; G06F 17/277
USPC .......................................................... 704/9
See application file for complete search history.

(56) References Cited

U.S. PATENT DOCUMENTS

| | | | |
|---|---|---|---|
| 2005/0149851 A1* | 7/2005 | Mittal | G06F 17/2235 715/205 |
| 2007/0061415 A1 | 3/2007 | Emmett et al. | |
| 2010/0228693 A1* | 9/2010 | Dawson | G06F 17/2705 706/12 |
| 2012/0179449 A1 | 7/2012 | Raskino et al. | |
| 2013/0144607 A1 | 6/2013 | Weber | |
| 2013/0227401 A1* | 8/2013 | Kandekar | G06F 17/30719 715/254 |
| 2013/0332460 A1* | 12/2013 | Pappas | G06F 17/30705 707/740 |
| 2014/0229159 A1* | 8/2014 | Branton | G06F 17/30719 704/9 |

\* cited by examiner

*Primary Examiner* — Bharatkumar S Shah
(74) *Attorney, Agent, or Firm* — Cooper Legal Group, LLC

(57) ABSTRACT

Systems, methods, and apparatuses are disclosed for adaptively generating a summary of web-based content based on an attribute of a mobile communication device having transmitted a request for the web-based content. By adaptively generating the summary based on an attribute of the mobile communication device such as an amount of visual space available or a number of characters permitted in the interface, a display of the web-based content may be controlled on the mobile communication device in a way that was not previously available. This enables control of displaying web-based content that has been adaptively generated to be displayed on limited display screens based on a learned attribute of the mobile communication device requesting the web-based content.

17 Claims, 5 Drawing Sheets

US 10,042,924 B2

SCALABLE AND EFFECTIVE DOCUMENT SUMMARIZATION FRAMEWORK

BACKGROUND

Data processing systems may be available over a network to provide web-based content to communication devices requesting such content. Although the amount of web-based content made available to a communication device may be vast, the communication device is a physical device having limited display space on a display screen to display the request web-based content. In addition, users of such communication devices may not have the time or patience to shift through vast amounts of web-based content. The display space on a display screen of a mobile communication device may be even smaller.

Accordingly, systems, methods, and apparatuses for generating a more efficient display of the web-based content, and controlling the display of the web-based content on a mobile communication device are disclosed.

DETAILED DESCRIPTION

Figure 1:
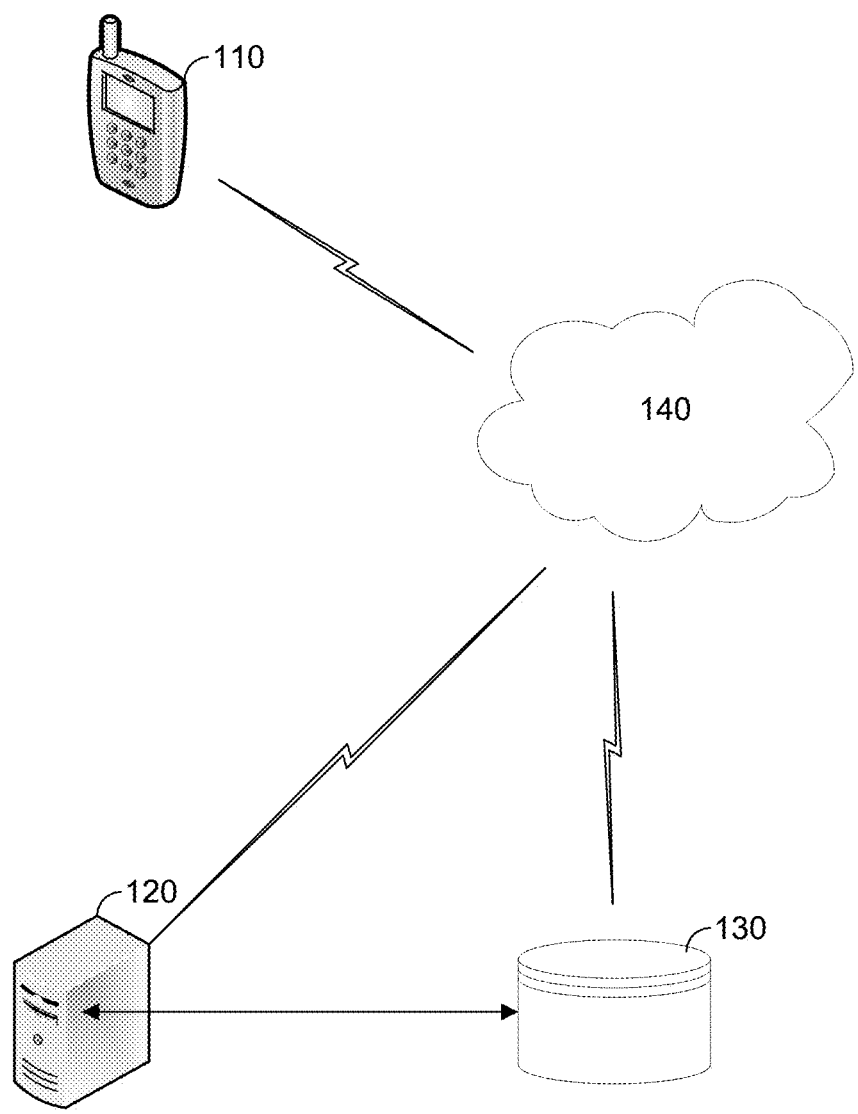
FIG. 1 illustrates a schematic diagram of an exemplary network.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the increasing popularity of mobile and portable devices, users are increasingly viewing web-based content (e.g., webpages, applications displaying websites, etc.) on their mobile and portable devices. However, when compared to a traditional home personal computer, a user's mobile or portable device may have a smaller display screen.

It follows that the present disclosure describes a summarization engine configured to adaptively generate a summary of web-based content to be more easily viewable when displayed on a user's mobile or portable device. The summarization engine may generate the summary of web-based content based, at least in part, on a target summary length (e.g., target length of a textual summary measured in number of characters, words, or sentences). The target summary length may be pre-stored on a memory, transmitted along with a viewing request to view the web-based content, or determined from an attribute of the user device transmitting the viewing request. For example, the target summary length may be generated based on an attribute of a mobile communication device such as an amount of visual space available or a number of characters permitted on a viewing interface of the mobile communication device.

According to some aspects, a summarization engine is disclosed. The summarization engine may comprise a memory configured to store a document including textual information, an interface configured to receive a viewing request from a communication device, the viewing request corresponding to the document, and a processor. The processor may be configured to communicate with the memory and interface, in response to receiving the viewing request, determine a target summary length, wherein the target summary length identifies a targeted length for a generated summary, and generate a summary of the document based on a summarization strategy, wherein the summarization strategy is adaptable based on the target summary length.

According to some aspects, a method for generating a summary of a document is disclosed. The method may comprise receiving, through an interface, a viewing request from a communication device, the viewing request corresponding to a document including textual information stored on a memory, in response to receiving the viewing request, determining a target summary length, and generating a summary of the document based on a summarization strategy, wherein the summarization strategy is adaptable based on the target summary length.

According to some aspects, a method for assigning each sentence structure a weighted score based on the analysis and the target summary length comprises scoring the sentence as it appears in the original document, and scoring the sentence as it appears in a partial summary consisting of one or more sentence structures already selected from the original document.

According to some aspects, a method for selecting one or more sentence structures from the plurality of sentence structures based on a comparison of the weighted score assigned to the plurality of sentence structures comprises choosing sentence structures to form a candidate summary in accordance with a summarization policy, modeling the combination of scores for each sentence structure in the candidate summary as a linear function of the scores of each sentence structure, learning the coefficients of this linear function from a training dataset of documents and human-authored summaries via learning algorithms such as the structured perceptron, and selecting the candidate summary with the highest score under the linear model as the summary proposed by the system.

According to some aspects, a method for choosing sentence structures to form a candidate summary in accordance with a summarization policy comprises considering each sentence in the original document, re-computing the portion of the sentence score which depends on the partial summary, and adding the highest-scoring sentence to a candidate summary such that the target summary length is not exceeded.

According to some aspects, a method for choosing sentence structures to form a candidate summary in accordance with a summarization policy comprises considering each sentence in the original document that appears after every sentence in a partial summary, re-computing the portion of the sentence score which depends on the partial summary, and adding the highest-scoring sentence to a candidate summary such that the target summary length is not exceeded.

According to some aspects, a method for choosing sentence structures to form a candidate summary in accordance with a summarization policy comprises considering each sentence in the original document that appears at the beginning or end of a paragraph in the original document, re-computing the portion of the sentence score which depends on the partial summary, and adding the highest-scoring sentence to a candidate summary such that the target summary length is not exceeded.

According to some aspects, a method for choosing sentence structures to form a candidate summary in accordance with a summarization policy comprises considering the sentence which appears in the original document directly after the last sentence from the partial summary, or which appears anywhere in the original document if the partial summary is empty, re-computing the portion of the sentence score which depends on the partial summary, and adding the highest-scoring sentence to a candidate summary such that the target summary length is not exceeded.

According to some aspects, a method for generating the summary based on the selected one or more sentence structures in accordance to the summarization strategy comprises ordering the selected sentence structures in order of their selection or their appearance in the original document, identifying the viewable number of characters for displaying the generated summary, and truncating the ordered sentence structures to the nearest character, word or sentence if their length collectively exceeds the viewable number of characters.

FIG. 1 illustrates a schematic diagram of an exemplary network system 100. The network system 100 may provide a platform for generating a summary of web-based information and providing the summary back to a user who submitted a viewing request for the web-based information through a network 140, such as the Internet. For example, a user operating user device 110 may control a web browsing application to transmit a viewing request to web server 120 for viewing content provided on a website hosted by web server 120. According to some embodiments, web server 120 may include a summarization engine configured to generate a summary of content hosted by web server 120. The summarization engine may be software, hardware, firmware, or a combination thereof, corresponding to web server 120. Although not illustrated, according to some embodiments the summarization engine may be a separate server in communication with web server 120. It follows that the summarization engine may receive the viewing request from user device 110 and, in response to the viewing request, generate a summary of the requested content. The summarization engine may further transmit the summary back to the user device 110. According to some embodiments, the summarization engine may further control certain aspects of displaying the summary on the user device 110. These and other features of the summarization engine and related features will be described in more detail below.

In the network system 100, user device 110 is coupled, through network 140, with web server 120. A user operating user device 110 may be running a web browser application on the user device 110 to access a web page, documents, or other web-based information available on web server 120. The web-based information made available by web server 120 may be stored directly on a memory of web server 120, or may be stored on database 130 accessible by web server 120. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided. Accordingly, the web server 120 may be coupled with database 130 either directly or through network 140. According to some embodiments, database 130 may be included as part of web server 120.

User device 110 may be a computing device which allows a user to connect to network 140. User device 110 may provide an interface for requesting/accessing/viewing web-based information made available by, for example, web server 120. In addition, user device 110 may provide an interface for accessing/controlling the web server 120. User device 110 may also be referred to as a client device and may include a computing device capable of sending or receiving signals, such as via a wired or a wireless network (e.g. the network 140, which may be the Internet). A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example User device 110 may, for example, include a desktop computer or a portable device, such as a cellular telephone, a smart phone, a display pager, a radio frequency (RF)

device, an infrared (IR) device, a Personal Digital Assistant (PDA), a handheld computer, a tablet computer, a laptop computer, a set top box, a wearable computer, an integrated device combining various features, such as features of the forgoing devices, or the like. User device 110 may include or may execute a variety of operating systems, including a personal computer operating system, such as a Windows, iOS or Linux, or a mobile operating system, such as iOS, Android, or Windows Mobile, or the like. Further, user device 110 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. User device 110 may also include or execute an application to communicate content, such as, for example, textual content, multimedia content, or the like. User device 110 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

With respect to network 140, network 140 may couple devices so that communications may be exchanged, such as between web server 120 and user device 110, or other types of devices, including between wireless devices coupled via a wireless network, for example. Network 140 may also include mass storage, such as network attached storage (NAS), a storage area network (SAN), or other forms of computer or machine readable media, for example. Network 140 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within the larger network 140. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to network 140, such as via a telephone line or link, for example.

Network 140 may include a wireless network configured to couple the user device 110 with other client devices coupled to the wireless network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, network 140 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within network 140, or the like.

Signal packets communicated via network 140, which may include a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of network 140, such as, for example, to one or more sites employing a local network address. A signal packet may, for example, be communicated over the Internet from a user site via an access node coupled to the Internet. Likewise, a signal packet may be forwarded via network nodes to a target site coupled to network 140 via a network access node, for example. A signal packet communicated via the Internet may, for example, be routed via a path of gateways, servers, etc. that may route the signal packet in accordance with a target address and availability of a network path to the target address.

Network 140 may also include a "content delivery network" or "content distribution network" (CDN), where the CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Network 140 may also include a peer-to-peer (or P2P) network, where the P2P network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 2:
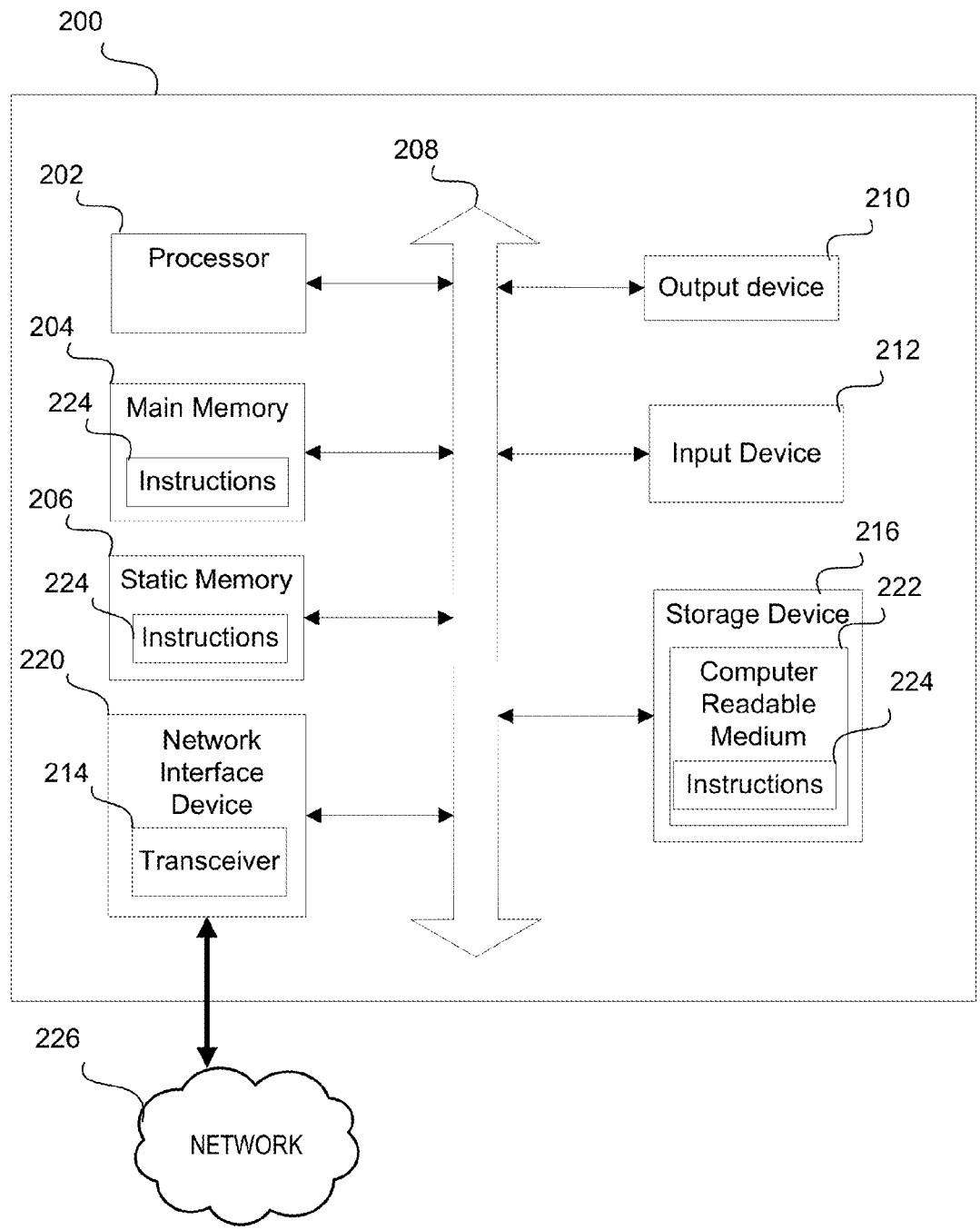
FIG. 2 illustrates a block diagram of exemplary computer architecture for one or more components included in the exemplary network illustrated in FIG. 1.

FIG. 2 illustrates exemplary computer architecture for computer 200. Embodiments of computer 200, including embodiments that include additional components and embodiments including fewer components than described, may be representative of any one or more of the devices illustrated in FIG. 1.

Computer 200 includes a network interface device 220 that enables communication with other computers via a network 226, where network 226 may be represented by network 140 in FIG. 1. The computer 200 may include a processor 202, a main memory 204, a static memory 206, the network interface device 220, an output device 210 (e.g., a display or speaker), an input device 212, and a storage device 216, all connected via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 202 executes instructions and includes portions of the computer 200 that control the operation of the entire computer 200. The processor 202 may also represent a controller that organizes data and program storage in memory and transfers data and other information between the various parts of the computer 200.

The processor 202 is configured to receive input data and/or user commands from the input device 212. The input device 212 may be a keyboard, mouse or other pointing device, trackball, scroll, button, touchpad, touch screen, keypad, microphone, speech recognition device, video recognition device, or any other appropriate mechanism for the user to input data to the computer 200 and control operation of the computer 200 and/or operation of the summarization engine described herein. Although only one input device 212 is shown, in another embodiment any number and type of input devices may be included. For example, input device 212 may include an accelerometer, a gyroscope, and a global positioning system (GPS) transceiver.

The processor 202 may also communicate with other computers via the network 226 to receive instructions 224, where the processor may control the storage of such instructions 224 into any one or more of the main memory 204, such as random access memory (RAM), static memory 206, such as read only memory (ROM), and the storage device 216. The processor 202 may then read and execute the instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the summarization engine described herein.

Although computer 200 is shown to contain only a single processor 202 and a single bus 208, the disclosed embodiment applies equally to computers that may have multiple processors and to computers that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer 200 is drawn to contain the storage device 216, it may be distributed across other computers, for example on a server.

The storage device 216 may include a controller (not shown) and a computer readable medium 222 having instructions 224 capable of being executed by the processor 202 to carry out processes described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 216 may also contain additional software and data (not shown), which is not necessary to understand the features described herein.

Output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly, in some embodiments the output device 210 displays a user interface. In other embodiments, the output device 210 may be a speaker configured to output audible information to the user. In still other embodiments, any combination of output devices may be represented by the output device 210.

Network interface device 220 provides the computer 200 with connectivity to the network 226 through any suitable communications protocol. The network interface device 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with a network 226 or other computer device having some or all of the features of computer 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller).

Computer 200 may be implemented using any suitable hardware and/or software, such as a personal computer or other electronic computing device. In addition to the various types of wearable devices described herein, computer 200 may also be a portable computer, laptop, tablet or notebook computer, PDA, pocket computer, appliance, telephone, or mainframe computer.

Figure 3:
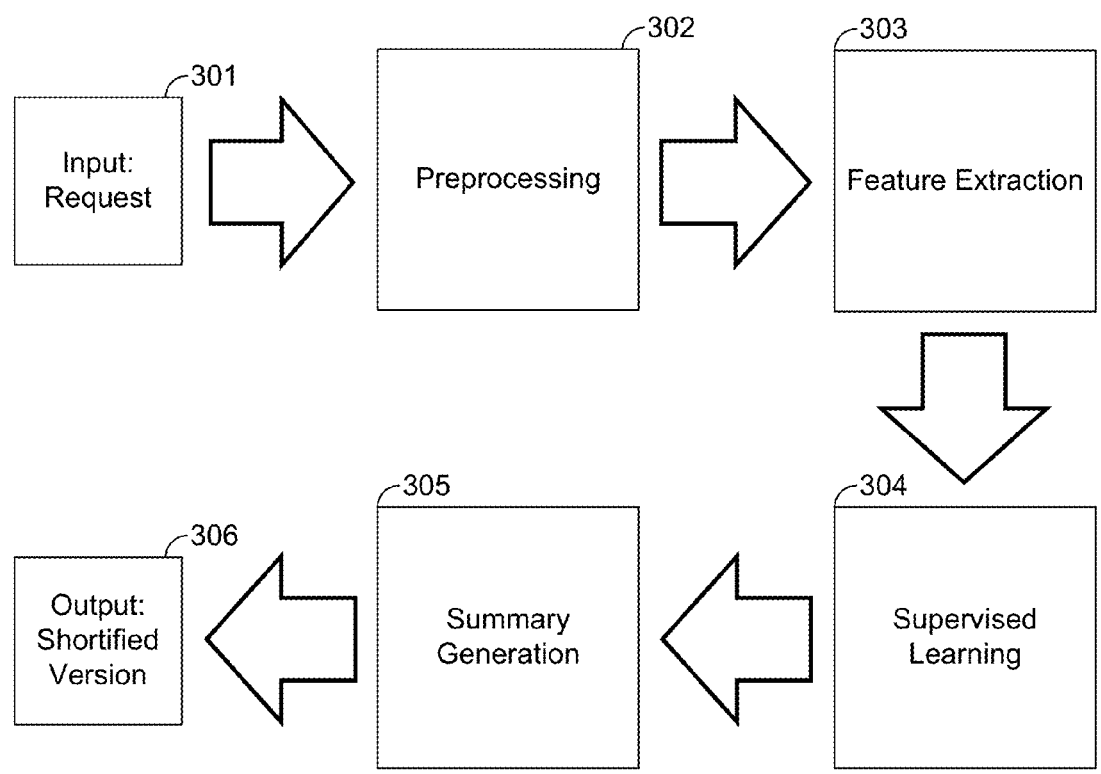
FIG. 3 illustrates a flow diagram describing a framework process for generating a summary of content, according to some embodiments.

FIG. 3 illustrates a flow diagram 300 describing an exemplary framework process of the summarization engine described herein. The network system 100 will be referenced to describe the logic for flow diagram 300 for exemplary purposes. As described, the summarization engine may be included on the web server 120, where the web server 120 is understood to host a content (e.g., webpage, document, article, paper, or other web-based content) being requested by a viewing request transmitted from the user device 110. Alternatively, the summarization engine may be understood to be running on a different server that is in communication with the web server 120 hosting the requesting content.

Initially, at 301 the viewing request may be received by the summarization engine from the user device 110. The viewing request may be a request to view/receive web-based content such as, for example, a website, document, or other information stored on the web server 120, or a database (e.g., database 130) coupled to the web server 120. According to some embodiments, the viewing request may include attribute information describing one or more attributes of the user device 110. For example, the attribute information may describe a display screen size of the user device 110 and/or a display screen size of a user interface on the user device 110 that will display the content requested in the viewing request. According to some embodiments, the viewing request may include target summary length information. The target summary length information may later be referenced by the summarization engine when generating a summary of the requested content.

At 302, the summarization engine may implement a preprocessing process. The preprocessing process may, for example, extract textual information from the requested content. The textual information may include alphanumeric and symbol information consistent with written sentences. The preprocessing process may further include natural language analysis on the extracted textual information where the summarization engine identifies sentence structures from the extracted textual information. A sentence structure may be understood to be a known sentence structure comprised of one or more words and ending in a known sentence ending punctuation.

According to some embodiments, the preprocessing process may include further natural language analysis on the extracted textual information where the summarization engine determines a token tag that identifies tokens (e.g., words) from one or more of the sentence structures, and tags the sentence structure with a token tag that identifies a number of tokens identified within the sentence structure. The sentence structure may be assigned a sentence structure score that corresponds to the number of tokens within the sentence structure, as identified by the token tag.

According to some embodiments, the preprocessing process may include further natural language analysis on the extracted textual information where the summarization engine determines a part of speech type that identifies parts of speech of words (e.g., noun, verb, adjective, adverb, pronoun, preposition, conjunction, interjection, article, and/or determiner) included in the sentence structure, and tags the sentence structure with part of speech tags that identify one or more parts of speech of words identified from the structured sentence. The sentence structure may be assigned a sentence structure score that corresponds to the part of speech tags assigned to the sentence structure. For example, a predetermined value may be added, or deleted, to the sentence structure score for each part of speech word identified in the sentence structure. According to some embodiments, a predetermined value may be added, or deleted, to the sentence structure score based on a number of part of speech tags identified in the sentence structure.

According to some embodiments, the preprocessing process may include further natural language analysis on the extracted textual information where the summarization engine determines a pronoun type that identifies specific pronoun words (e.g., predetermined persons, places, or things) included in the sentence structures, and tags the sentence structure with pronoun tags that identify the specific pronouns included in the sentence structure. The sentence structure may be assigned a sentence structure score that corresponds to the pronoun tags assigned to the sentence structure. For example, a predetermined value may be added, or deleted, to the sentence structure score for each pronoun identified in the sentence structure. According to some embodiments, a predetermined value may be added, or deleted, to the sentence structure score based on the number of pronouns identified from the sentence structure. According to some embodiments, a same, or different, predetermined value may be added, or deleted, to the sentence structure score based on specific pronouns identified from the sentence structure.

Referring back to flow diagram 300, at 303 the summarization engine may implement a feature extraction process to analyze one or more sentence structures identified from the preprocessing process at 302, and tag the sentence structure with an appropriate feature types tag. The features types tag may be assigned to a sentence structure and describe one or more feature types identified from the analysis of the sentence structure according to the feature extraction process.

Exemplary feature types may include a position type, where the position type identifies the sentence structure's position within the requested web-based content (e.g., $1^{st}$ sentence structure within entire document; or $2^{nd}$ sentence structure within a paragraph). The sentence structure may be assigned a sentence structure score that corresponds to the position of the sentence structure as identified by the position type of the sentence structure. For example, a predetermined value may be added, or deleted, to the sentence structure score depending on the position of the sentence structure as identified from the corresponding position type. According to some embodiments, a higher predetermined value may be added, or deleted, to the sentence structure score when the sentence structure is positioned closer to the beginning of the requested web-based content, than for when the sentence structure is positioned closer to the end of the requested web-based content. According to some embodiments, a lower predetermined value may be added, or deleted, to the sentence structure score when the sentence structure is positioned closer to the beginning of the requested web-based content, than for when the sentence structure is positioned closer to the end of the requested web-based content. The predetermined value may be assigned based on the target summary length.

The feature types may also include a length type, where the length type identifies a length of the sentence structure in a number of words or number of individual characters, or average length of words within the sentence structure. The sentence structure may be assigned a sentence structure score that corresponds to the length of the sentence structure as identified by the length type of the sentence structure. For example, a predetermined value may be added, or deleted, to the sentence structure score depending on the length of the sentence structure as identified from the corresponding length type. According to some embodiments, a higher predetermined value may be added, or deleted, to the sentence structure score when the sentence structure is shorter in length than for when the sentence structure is longer in length. According to some embodiments, a lower predetermined value may be added, or deleted, to the sentence structure score when the sentence structure is shorter in length than for when the sentence structure is longer in length. The predetermined value may be assigned based on the target summary length.

The feature types may also include a content type, where the content type identifies whether the contents of the sentence structure exhibit a similarity to information included in the viewing request (e.g., an internet search query that led to the viewing request of the current web content), a similarity to the headline of the current web content, a similarity to the title of the current web content, or a similarity to the contents of the requested web-based content. A determination of finding similarity may be based on exceeding a predetermined similarity threshold, according to a known method of determining similarity in the field of natural language analysis, such as a cosine similarity or other type of similarity metric. The sentence structure may be assigned a sentence structure score that corresponds to the similarity of the sentence structure as described herein. For example, a predetermined value may be added, or deleted, to the sentence structure score depending on the similarity of the sentence structure as identified from the corresponding content type. According to some embodiments, a higher predetermined value may be added, or deleted, to the sentence structure score when the sentence structure is determined to be more similar than for when the sentence structure is determined to be less similar. According to some embodiments, a lower predetermined value may be added, or deleted, to the sentence structure score when the sentence structure is determined to be more similar than for when the sentence structure is determined to be less similar. The predetermined value may be assigned based on the target summary length.

The feature types may also include a lexical cues type, where the lexical cues type identifies whether the sentence structure includes parts, or all, of a webpage URL corresponding to the current web content, or whether the sentence structure includes predetermined words or predetermined word patterns. The sentence structure may be assigned a sentence structure score that corresponds to the identification of lexical cues within the sentence structure as described herein. For example, a predetermined value may be added, or deleted, to the sentence structure score depending on the lexical cues identified within the sentence structure as identified from the corresponding lexical cues type. According to some embodiments, a higher predetermined value may be added, or deleted, to the sentence structure score when the sentence structure is determined to include certain one or more lexical cues than for when the sentence structure is determined to include certain one or more different lexical cues. According to some embodiments, a lower predetermined value may be added, or deleted, to the sentence structure score when the sentence structure is determined to include certain one or more lexical cues than for when the sentence structure is determined to include certain one or more different lexical cues. The predetermined value may be assigned based on the target summary length.

The feature types may also include a syntactic cues type, where the syntactic cues type identifies whether the sentence structure includes specific predetermined pronouns, specific questions, specific words (e.g., such as question words "who, what, when, how, where"), or other predetermined syntactic features. The sentence structure may be assigned a sentence structure score that corresponds to the syntactic cues identified from the sentence structure as described herein. For example, a predetermined value may be added, or deleted, to the sentence structure score depending on the syntactic cues identified from the sentence structure as identified from the corresponding syntactic cues type. According to some embodiments, a higher predetermined value may be added, or deleted, to the sentence structure score when the sentence structure is determined to include certain one or more syntactic cues than for when the sentence structure is determined to include certain one or more different syntactic cues. According to some embodiments, a lower predetermined value may be added, or deleted, to the sentence structure score when the sentence structure is determined to include certain one or more syntactic cues than for when the sentence structure is determined to include certain one or more different syntactic cues. The predetermined value may be assigned based on the target summary length.

The feature types may also include a discourse type, where the discourse type identifies whether a question word (e.g., such as question words "who, what, when, how, where") or a question punctuation (e.g., question mark '?') is included in the sentence structure. The sentence structure may be assigned a sentence structure score that corresponds to the discourse type identified from the sentence structure as described herein. For example, a predetermined value may be added, or deleted, to the sentence structure score depending on the disclosure features identified from the sentence structure as identified from the corresponding discourse type. According to some embodiments, a higher predetermined value may be added, or deleted, to the sentence structure score when the sentence structure is determined to include certain one or more discourse features than for when the sentence structure is determined to include certain one or more different discourse features. According to some embodiments, a lower predetermined value may be added, or deleted, to the sentence structure score when the sentence structure is determined to include certain one or more discourse features than for when the sentence structure is determined to include certain one or more different discourse features. The predetermined value may be assigned based on the target summary length.

Referring back to flow diagram 300, at 304 the summarization engine may implement a supervised learning process. The supervised learning process may include a scoring process and a selecting process. The scoring process may include the generation of a sentence structure score for each of the identified sentence structures based on feature types assigned to the sentence structure, as described herein.

Figure 4:
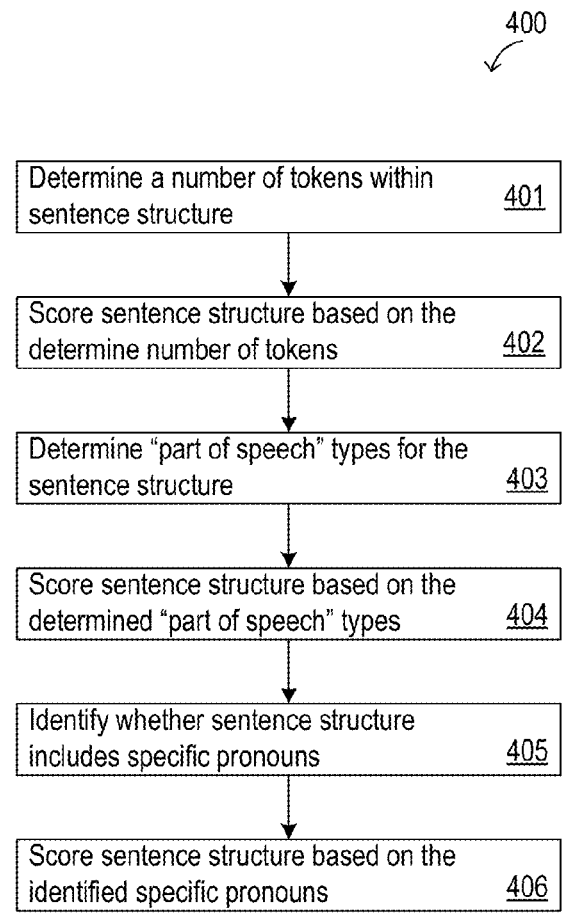
FIG. 4 illustrates a flow chart describing a process for scoring a sentence structure, according to some embodiments.

FIG. 4 illustrates flow chart 400 that describes an exemplary process for determining a sentence structure score that may occur during the supervised learning implemented by the summarization engine at 304. The process described by flow chart 400 may be based on one or more factors described as being determined during the preprocessing process at 302 in flow diagram 300.

At 401, the summarization engine may determine a number of tokens within a sentence structure identified from a document, according to a process described herein.

At 402, the summarization engine may generate, or modify, a sentence structure score assigned to the sentence structure based on the determined number of tokens, according to a process described herein.

At 403, the summarization engine may determine "part of speech" types for the sentence structure identified from the document, according to a process described herein.

At 404, the summarization engine may generate, or modify, the sentence structure score assigned to the sentence structure based on the determined "part of speech" types for the sentence structure, according to a process described herein.

At 405, the summarization engine may identify whether the sentence structure includes specific pronouns, according to a process described herein.

At 406, the summarization engine may generate, or modify, the sentence structure score assigned to the sentence structure based on the identified specific pronouns, according to a process described herein.

The process described by flow chart 400 is an exemplary process for determining a sentence structure score based on the different factors described with reference to the preprocessing process at 302 according to some embodiments. According to other embodiments, a process for determining a sentence structure score based on the different factors described with reference to the preprocessing process at 302 may include additional, or fewer, processes.

Figure 5:
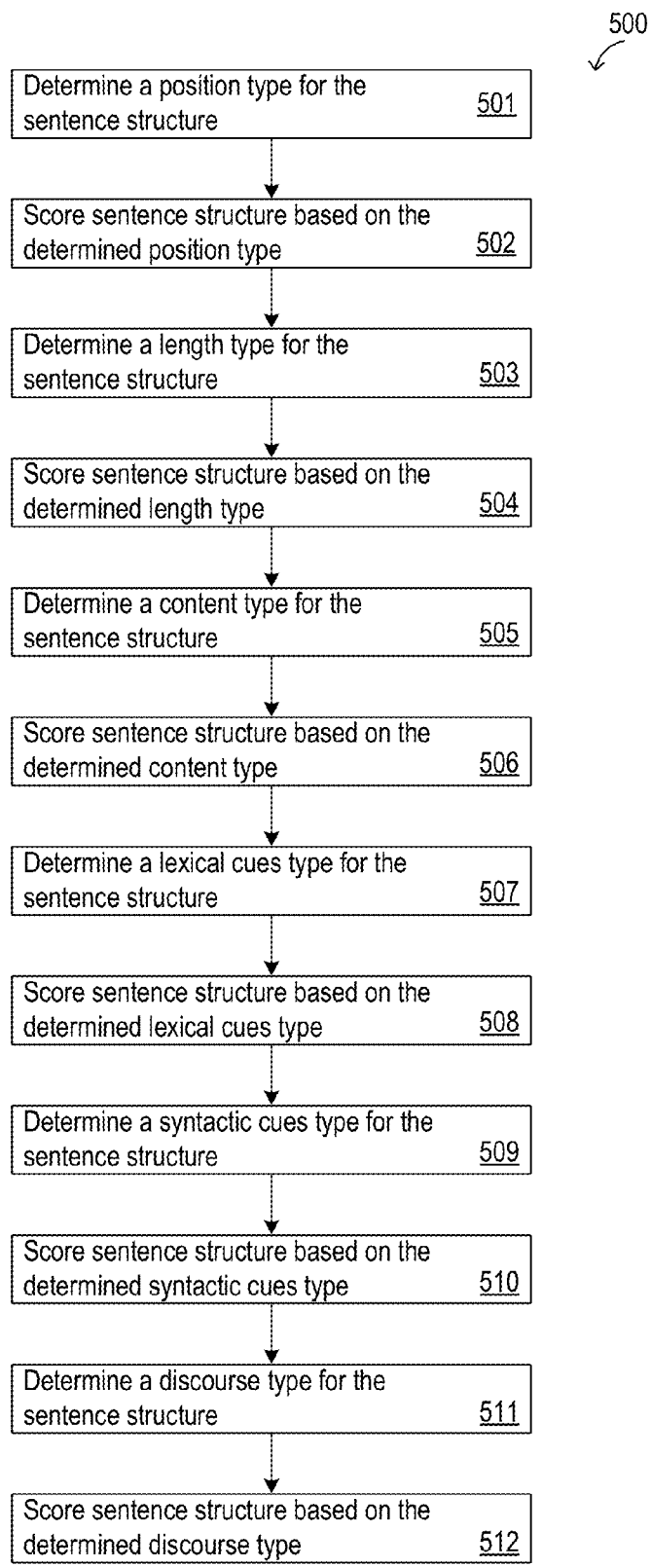
FIG. 5 illustrates a flow chart describing a process for scoring a sentence structure, according to some embodiments.

FIG. 5 illustrates flow chart 500 that illustrates an exemplary process for determining a sentence structure score that may occur during the supervised learning implemented by the summarization engine at 304. The process described by flow chart 500 may be based on one or more factors described as being determined during the feature extraction process at 303 in flow diagram 300.

At 501, the summarization engine may determine a position type of a sentence structure identified from a document, according to a process described herein.

At 502, the summarization engine may generate, or modify, a sentence structure score assigned to the sentence structure based on the determined position type for the sentence structure, according to a process described herein.

At 503, the summarization engine may determine a length type for the sentence structure identified from the document, according to a process described herein.

At 504, the summarization engine may generate, or modify, the sentence structure score assigned to the sentence structure based on the determined length type for the sentence structure, according to a process described herein.

At 505, the summarization engine may determine a content type for the sentence structure identified from the document, according to a process described herein.

At 506, the summarization engine may generate, or modify, the sentence structure score assigned to the sentence structure based on the determined content type for the sentence structure, according to a process described herein.

At 507, the summarization engine may determine a lexical cues type for the sentence structure identified from the document, according to a process described herein.

At 508, the summarization engine may generate, or modify, the sentence structure score assigned to the sentence structure based on the determined lexical cues type for the sentence structure, according to a process described herein.

At 509, the summarization engine may determine a syntactic cues type for the sentence structure identified from the document, according to a process described herein.

At 510, the summarization engine may generate, or modify, the sentence structure score assigned to the sentence structure based on the determined syntactic cues type for the sentence structure, according to a process described herein.

At 511, the summarization engine may determine a discourse type for the sentence structure identified from the document, according to a process described herein.

At 512, the summarization engine may generate, or modify, the sentence structure score assigned to the sentence structure based on the determined discourse type for the sentence structure, according to a process described herein.

The process described by flow chart 500 is an exemplary process for determining a sentence structure score based on the different factors described with reference to the feature extraction process at 303 according to some embodiments. According to other embodiments, a process for determining a sentence structure score based on the different factors described with reference to the feature extraction process at 303 may include additional, or fewer, processes.

Referring back to the supervised learning 304 described by flow diagram 300, the selecting process for combining into a summary may include selecting one or more sentence structures having the highest sentence structure scores. The sentence structure scores may also reference the target summary length, where the target summary length may be obtained according to any one or more of the methods described herein.

More specifically, one or more sentence structures may be selected based on their respective sentence structure score according to a known natural language selection algorithm such as, for example, greedy search or dynamic programming. This is not intended to be an exhaustive list. The equation for calculating the highest-scoring summary $\hat{S}$ is provided, for example, by Table 2.

TABLE 2

$$\hat{S} = \arg\max_{S \subseteq D} \text{score}(S, D)$$

$$\text{s.t. cost}(S) < b$$

For any document D being considered by the summarization engine, the goal is to recover the highest-scoring summary $\hat{S}$ which can be accommodated within a predetermined budget b, where the budget b may correspond to the target summary length.

Summaries are scored using a linear model, where $\phi$ is a feature map for summaries and w is a vector of learned parameters. This allows the scoring function to model phenomena such as diversity and coherence. For example, w may be a weight vector of length n. The linear model may follow, for example, the equation provided in Table 3.

TABLE 3

$$\text{score}(S, D) = w^T \Phi(S, D)$$

The sentence structure scoring function may be automatically learned from training data using a learning algorithm such as, for example, the structured perceptron algorithm provided in Table 1. In the structured perception algorithm provided in Table 1, the input document D may correspond to the current web content requested by the viewing request. The input document is represented as a set $\{x_1, \ldots, x_n\}$ of n sentences (i.e., sentence structures). The summary generated by the summarization engine may be represented by S, where the summary S is comprised of sentences from the document D ($S \leq D$).

TABLE 1

Algorithm 1 Structured perceptron (Collins, 2002)

Input: training dataset $\mathcal{D}$, feature map $\Phi$,
learning rate $\eta$
Output: vector of learned parameters w
1:    $w \leftarrow 0^{|\Phi|}$
2:    $k \leftarrow 0$
3:    while not converged do
4:        for instance $(D, S^*) \in \mathcal{D}$ do
5:            $\hat{S} \leftarrow \arg\max_S w_k^T \Phi(D, S)$
6:            if $\hat{S} \neq S^*$ then
7:                $w_{k+1} \leftarrow w_k + \eta (\Phi(D, S^*) - \Phi(D, \hat{S}))$
8:                $k \leftarrow k + 1$ return average weights $\frac{1}{k} \sum_j w_j$ In order to train the parameters w, assumed is the existence of a training dataset $\mathcal{D}$ comprised of instances <D, S*> where S* represents the reference summary for some input document D. The parameters re estimated using the structured perceptron which minimizes a 0/1 loss over training dataset $\mathcal{D}$ and incorporates parameter averaging for generalization. When inference is inexact and carried out via search, as in the case of the summarizers, convergence and performance can be improved using violation-fixing weight updates.

Referring back to flow diagram 300, at 305 the summarization engine may generate the summary of the requested web content by combining the sentence structures selected from the supervised learning at 304. The generated summary may combine the selected sentence structures to maintain an order of the selected sentence structures within the document. The selection strategy implemented by the summarization engine may select a predetermined number of highest scoring sentence structures that still fits within the target summary length. According to some embodiments, the selection strategy implemented by the summarization engine may select as many top highest scoring sentence structures that still fit within the target summary length.

At 306, the summarization engine may control output of the summary in the shortified version. For example, the summarization engine may control transmission of the summary back to the user device 110 that transmitted the viewing request. According to some embodiments, the transmission of the summary may include instructions for controlling a display of the summary on the user device 110 such that the summary fits within a display screen of the user device 110 or graphical interface running on the user device 110.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is therefore intended that the foregoing detailed description be regarded as illustrative rather than limiting, and that it be understood that it is the following claims, including all equivalents, that are intended to define the spirit and scope of this disclosure.

What is claimed is:

1. A summarization engine comprising:
   a memory configured to store a document including textual information;
   an interface configured to receive a viewing request from a communication device, the viewing request corresponding to the document; and
   a processor configured to:
      communicate with the memory and interface;
      in response to receiving the viewing request, determine a target summary length, wherein the target summary length identifies a targeted length for a generated summary;
      extract the textual information from the document;
      parse the textual information;
      identify a plurality of sentence structures from the textual information based on the parsing;
      assign each sentence structure a weighted score based on the target summary length;
      generate, in accordance with a summarization policy, candidate summaries to include one or more sentence structures from the plurality of sentence structures;
      determine a candidate score for each candidate summary as a linear function of the scores assigned to each sentence structure included in the respective candidate summary;
      learn coefficients of the linear function from a training dataset of documents and authored summaries via a predetermined learning algorithm; and
      select, from the generated candidate summaries, a generated summary determined to have the highest candidate score under the linear function.

2. The summarization engine of claim 1, wherein the processor is configured to generate the weighted score by:
   determining a position of each sentence structure within the document; and
   generating the weighted score of each sentence structure based on the determined position of each corresponding sentence structure.

3. The summarization engine of claim 1, wherein the processor is configured to generate the weighted score by:
   determining a content of each sentence structure within the document; and
   generating the weighted score of each sentence structure based on the determined content of each corresponding sentence structure.

4. The summarization engine of claim 1, wherein the processor is configured to generate the weighted score by:
   identifying one or more tokens from each sentence structure, wherein each identified token corresponds to a token type;

determining a token type of each identified token; and
generating the weighted score of each sentence structure based on the determined token type of each identified token of each corresponding sentence structure.

5. The summarization engine of claim 1, wherein the processor is configured to generate the weighted score by:
identifying one or more lexical cues from each sentence structure; and
generating the weighted score of each sentence structure based on the identified lexical cues of each corresponding sentence structure.

6. The summarization engine of claim 1, wherein the target summary length is included in the viewing request; and
wherein the processor is configured to determine the target summary length by extracting the target summary length from the viewing request.

7. The summarization engine of claim 6, wherein the target summary length corresponds to an attribute of the communication device transmitting the viewing request.

8. A method for generating a summary of a document, the method comprising:
receiving, through an interface, a viewing request from a communication device, the viewing request corresponding to a document including textual information stored on a memory;
in response to receiving the viewing request, determining a target summary length;
extracting the textual information from the document;
parsing the textual information;
identifying a plurality of sentence structures from the textual information based on the parsing;
assigning each sentence structure a weighted score based on the target summary length;
generating, in accordance with a summarization policy, candidate summaries to include one or more sentence structures from the plurality of sentence structures;
determining a candidate score for each candidate summary as a linear function of the scores assigned to each sentence structure included in the respective candidate summary;
learning coefficients of the linear function from a training dataset of documents and authored summaries via a predetermined learning algorithm; and
selecting, from the generated candidate summaries, a generated summary determined to have the highest candidate score under the linear function.

9. The method of claim 8, further comprising generating the weighted score by:
determining a position of each sentence structure within the document; and
generating the weighted score of each sentence structure based on the determined position of each corresponding sentence structure.

10. The method of claim 8, further comprising generating the weighted score by:
determining a content of each sentence structure within the document; and
generating the weighted score of each sentence structure based on the determined content of each corresponding sentence structure.

11. The method of claim 8, further comprising generating the weighted score by:
identifying one or more tokens from each sentence structure, wherein each identified token corresponds to a token type;
determining a token type of each identified token; and
generating the weighted score of each sentence structure based on the determined token type of each identified token of each corresponding sentence structure.

12. The method of claim 8, wherein assigning each sentence structure the weighted score based on the analysis and the target summary length comprises:
scoring each sentence structure as it appears in the document; and
scoring each sentence structure as it appears in a partial summary including one or more sentence structures already selected from the document.

13. The method of claim 8, wherein the predetermined learning algorithm is a structured perception.

14. The method of claim 8, wherein generating, in accordance with the summarization policy, the candidate summaries comprises:
considering each sentence structure included in the document;
revising each sentence score corresponding to a considered sentence structure; and
adding a highest-scoring sentence structure to the candidate summary such that the target summary length is not exceeded.

15. The method of claim 8, wherein generating, in accordance with the summarization policy, the candidate summaries comprises:
considering each sentence structure in the document that appears after every sentence structure in the partial summary;
revising each sentence score corresponding to a considered sentence structure; and
adding a highest-scoring sentence structure to the candidate summary such that the target summary length is not exceeded.

16. The method of claim 8, wherein generating, in accordance with the summarization policy, the candidate summaries comprises:
considering each sentence structure in the document that appears at a beginning or an end of a paragraph in the document;
revising each sentence score corresponding to a considered sentence structure; and
adding a highest-scoring sentence to the candidate summary such that the target summary length is not exceeded.

17. A method for generating a summary of a document, the method comprising:
receiving, through an interface, a viewing request from a communication device, the viewing request corresponding to a document including textual information stored on a memory;
in response to receiving the viewing request, determining a target summary length;
extracting the textual information from the document;
parsing the textual information;
identifying a plurality of sentence structures from the textual information based on the parsing;
analyzing each sentence structure from the plurality of sentence structures;
assigning each sentence structure a weighted score based on the analysis and the target summary length by:
scoring each sentence structure as it appears in the document; and
scoring each sentence structure as it appears in a partial summary including of one or more sentence structures already selected from the document;

choosing sentence structures to form a candidate summary in accordance with a summarization policy;
modeling a combination of scores for each sentence structure in the candidate summary as a linear function of the scores for each sentence structure;
learning coefficients of the linear function from a training dataset of documents and authored summaries via a predetermined learning algorithm;
selecting the candidate summary with the highest score under the linear function as the generated summary; and
generating a summary based on the selected candidate summary in accordance to a summarization strategy, wherein the summarization strategy is adaptable based on the target summary length.

* * * * *